United States Patent
Fukami et al.

(10) Patent No.: US 8,031,306 B2
(45) Date of Patent: Oct. 4, 2011

(54) LIQUID CRYSTAL DISPLAY DEVICE

(75) Inventors: Tetsuo Fukami, Ishikawa-gun (JP); Mitsutaka Okita, Hakusan (JP); Kenji Nakao, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 435 days.

(21) Appl. No.: 12/176,470

(22) Filed: Jul. 21, 2008

(65) Prior Publication Data

US 2009/0027576 A1    Jan. 29, 2009

(30) Foreign Application Priority Data

Jul. 26, 2007    (JP) .................................. 2007-194906

(51) Int. Cl.
*G02F 1/1335* (2006.01)
(52) U.S. Cl. ....................................... 349/114; 349/113
(58) Field of Classification Search ................... 349/114
See application file for complete search history.

(56) References Cited

U.S. PATENT DOCUMENTS

| | | | |
|---|---|---|---|
| 2003/0122767 A1 | 7/2003 | Nakao et al. | |
| 2005/0140869 A1* | 6/2005 | Yang et al. | ................... 349/114 |
| 2006/0203171 A1 | 9/2006 | Ozawa | |
| 2007/0019120 A1 | 1/2007 | Tasaka et al. | |
| 2007/0236629 A1* | 10/2007 | Wu et al. | ......................... 349/96 |

FOREIGN PATENT DOCUMENTS

JP    2003-75873    3/2003

OTHER PUBLICATIONS

U.S. Appl. No. 12/027,528, filed Feb. 7, 2008.

* cited by examiner

*Primary Examiner* — Wen-Ying P Chen
(74) *Attorney, Agent, or Firm* — Oblon, Spivak, McClelland, Maier & Neustadt, L.L.P.

(57) ABSTRACT

A device includes a first substrate including a pixel electrode and an underlayer electrode a part of which is opposed to the pixel electrode, a second substrate including a counter-electrode which is opposed to the pixel electrode, and a layer which is held between the first and the second substrate, and which is in a first state prior to power-on and transitions to a second state, at a time of a display operation, wherein the pixel electrode includes a first part that passes light and a second part that reflects light, the second part includes a projection which is opposed to the counter-electrode, and a transverse electric field generating section, which is provided near the projection so as to generate a transverse electric field between the underlayer electrode and the second part, is disposed at an end portion of the second part, which is opposed to the underlying electrode.

3 Claims, 4 Drawing Sheets

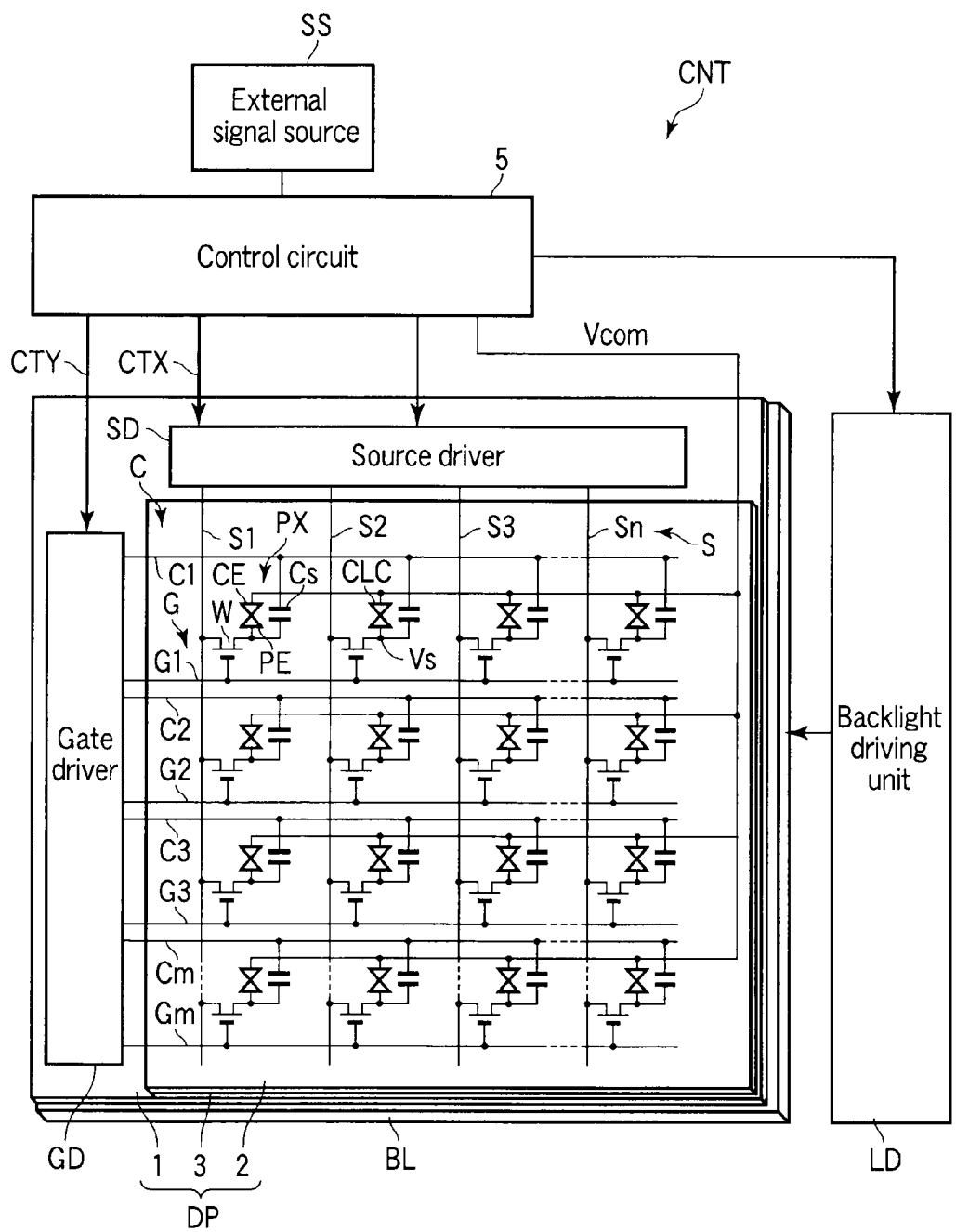
F I G. 1

LIQUID CRYSTAL DISPLAY DEVICE

CROSS-REFERENCE TO RELATED APPLICATIONS

This application is based upon and claims the benefit of priority from prior Japanese Patent Application No. 2007-194906, filed Jul. 26, 2007, the entire contents of which are incorporated herein by reference.

BACKGROUND OF THE INVENTION

1. Field of the Invention

The present invention relates generally to a liquid crystal display device, and more particularly to an active matrix liquid crystal display device.

2. Description of the Related Art

In general, a liquid crystal display device has a liquid crystal display panel which includes a pair of mutually opposed substrates, namely, an array substrate and a counter-substrate, and a liquid crystal layer which is held between the pair of substrates. The liquid crystal display panel includes a display section which is composed of a plurality of display pixels which are arrayed in a matrix. The array substrate includes pixel electrodes which are disposed in association with the plural display pixels, and the counter-substrate includes a counter-electrode which is opposed to the plural pixel electrodes.

In the case of a transflective liquid crystal display device, the liquid crystal layer includes a transmissive display area and a reflective display area. The pixel electrode includes a transmissive electrode part that passes light, which is incident from the array substrate side, to the liquid crystal layer, and that is disposed in the transmissive display area of the liquid crystal layer, and a reflective electrode part that reflects light which is incident from the counter-substrate side to the liquid crystal layer, and that is disposed in the reflective display area of the liquid crystal layer.

An OCB (Optically Compensated Bend) mode liquid crystal display device, compared to a liquid crystal display device of, e.g. a TN mode, has features of a high responsivity and a wide viewing angle. Hence, the OCB mode liquid crystal display device is suited to liquid crystal TV products or the like, the market of which is expected to steadily increase in the years to come.

In the OCB mode liquid crystal display device, when no voltage is applied to the liquid crystal layer, the alignment state of liquid crystal molecules, which are included in the liquid crystal layer, is a splay alignment state that is a non-display state. Thus, when the OCB mode liquid crystal display device is activated, it is necessary to execute initialization to change ("transition") the alignment state from the alignment state of liquid crystal molecules in the non-display state to the alignment state ("bend alignment") of liquid crystal molecules in the display state.

Conventionally, there is proposed a liquid crystal display device wherein a transverse electric field is generated between neighboring pixel electrodes, thereby facilitating the transition of liquid crystal molecules from the non-display alignment state to the display alignment state before an image is displayed, and thus quickly displaying an image (see Jpn. Pat. Appln. KOKAI Publication No. 2003-75873).

However, in the transmissive liquid crystal display device the pixel area is substantially planar, whereas in the transflective liquid crystal display device a recess-and-projection portion is provided, in some cases, on the reflective electrode part of the pixel area in the reflective pixel region, and it is necessary to form a proper transition nucleus for the three-dimensional recess-and-projection portion of the pixel electrode.

BRIEF SUMMARY OF THE INVENTION

The present invention has been made in consideration of the above-described problem, and the object of the invention is to decrease a time that is needed to initialize an OCB mode liquid crystal display device.

According to an aspect of the present invention, there is provided a liquid crystal display device comprising: a first electrode substrate including a pixel electrode and an underlayer wiring line to which a voltage that is different from a voltage of the pixel electrode is applied, and at least a part of which is opposed to the pixel electrode; a second electrode substrate including a counter-electrode which is opposed to the pixel electrode; and a liquid crystal layer which is held between the first electrode substrate and the second electrode substrate, and which is in a first state prior to power-on and transitions to a second state, which is different from the first state, at a time of a display operation, wherein the pixel electrode includes a transmissive electrode part that passes light, which is incident from the first electrode substrate side, to the liquid crystal layer, and a reflective electrode part that reflects light which is incident from the second electrode substrate side to the liquid crystal layer, the reflective electrode part includes a projection portion which is opposed to the counter-electrode, and a transverse electric field generating section, which is provided near the projection portion so as to generate a transverse electric field between the underlayer wiring line and the reflective electrode part, is disposed at an end portion of the reflective electrode part, which is opposed to the underlying wiring line.

According to the present invention, the time that is needed to initialize an OCB mode liquid crystal display device can be decreased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 schematically shows the structure of a liquid crystal display device according to a first embodiment of the present invention;

DETAILED DESCRIPTION OF THE INVENTION

Figure 2:
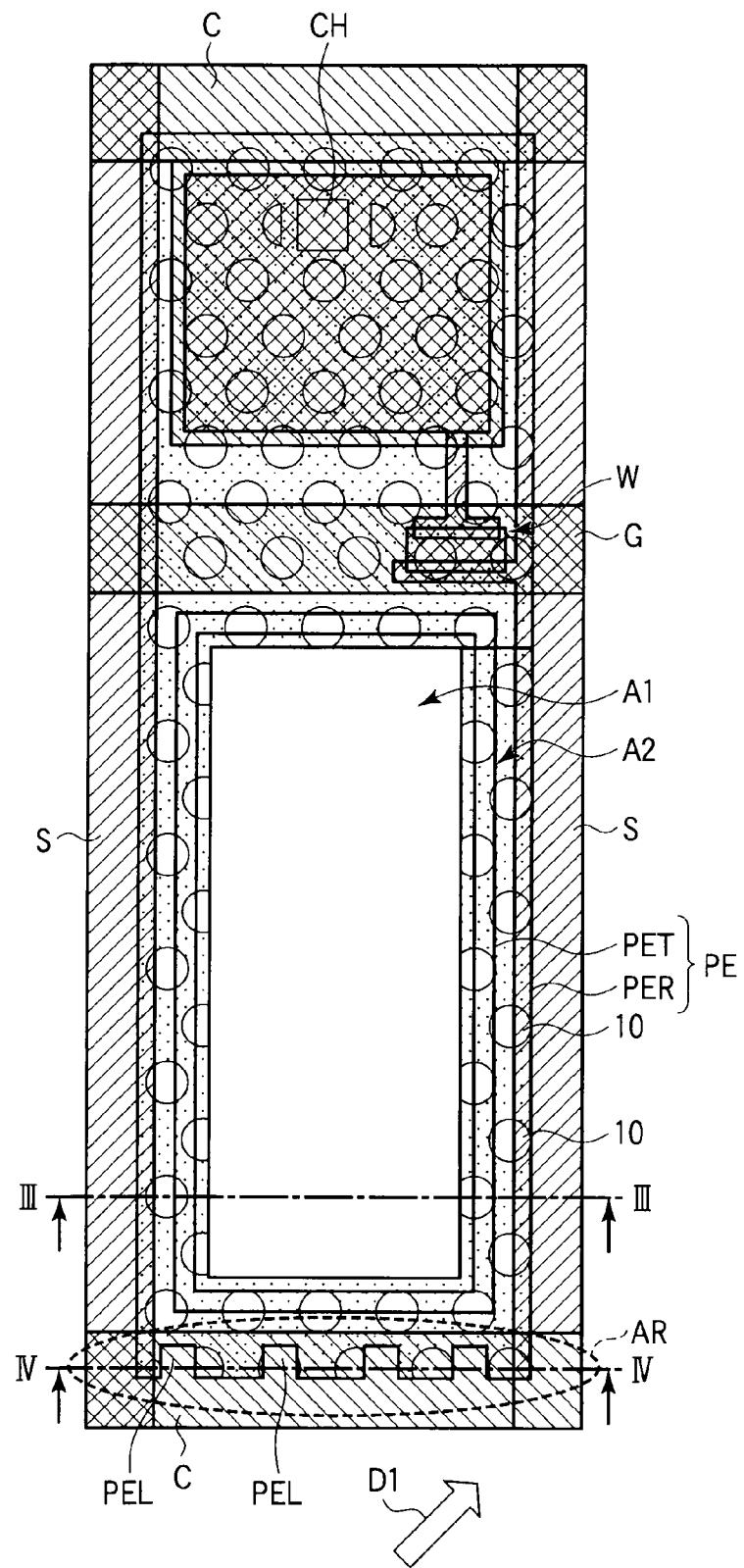
FIG. 2 is a view for describing a structure example of a display pixel of the liquid crystal display device shown in FIG. 1.

A liquid crystal display device according to an embodiment of the present invention will now be described with reference to the accompanying drawings. As shown in FIG. 1, the liquid crystal display device according to the embodiment includes an OCB mode liquid crystal display panel DP, a backlight BL which illuminates the liquid crystal display panel DP, and a controller CNT which controls the liquid crystal display panel DP and backlight BL.

The liquid crystal display panel DP includes a pair of electrode substrates, namely, an array substrate 1 and a counter-substrate 2, and a liquid crystal layer 3 which is held between the array substrate 1 and counter-substrate 2 and which is set in a first state prior to power-on and is set in a second state at a time of a display state, the second state being different from the first state. The liquid crystal layer 3 includes, as a liquid crystal material, an OCB mode liquid crystal which is transitioned in advance, for example, from a splay alignment state that is the first state to a bend alignment state that is the second state in order to execute a normally-white display operation.

In this embodiment, reverse transition of the liquid crystal from the bend alignment to the splay alignment is prevented by cyclically applying a high voltage, for example, a driving voltage which corresponds to black display as a non-video signal, to the liquid crystal layer 3.

In addition, the liquid crystal display panel DP includes a display section which is composed of display pixels PX that are arrayed substantially in a matrix. The array substrate 1 includes a transparent insulating substrate GL1 (shown in FIG. 3 to FIG. 5) which is formed of, e.g. glass. A plurality of pixel electrodes PE are disposed in association with the respective liquid crystal display pixels PX on the transparent insulating substrate GL1.

The counter-substrate 2 includes a color filter (not shown) which is formed of red, green and blue color layers disposed on a transparent insulating substrate GL2 (shown in FIG. 3 to FIG. 5) of, e.g. glass, and a counter-electrode CE which is disposed on the color filter and is opposed to the plural pixel electrodes PE.

The pixel electrodes PE and counter-electrode CE are covered with alignment films (not shown), respectively, which are subjected to rubbing treatment in a mutually parallel direction D1. Each pixel electrode PE and counter-electrode CE, together with a pixel region which is a part of the liquid crystal layer 3 that is controlled to have a liquid crystal molecular alignment corresponding to an electric field from the pixel electrode PE and counter-electrode CE, constitute the display pixel PX.

Each of the display pixels PX has a liquid crystal capacitance ClC which is constituted by the liquid crystal layer 3 that is held between the associated pixel electrode PE and counter-electrode CE. The liquid crystal capacitance ClC is determined by a specific dielectric constant of liquid crystal material, a pixel electrode area, and a liquid crystal cell gap. In addition, a storage capacitance Cs is constituted by a part of the pixel electrode PE and a part of a storage capacitance line C extending substantially in parallel to a scanning line G, which are stacked via an insulation film so as to be opposed to each other.

Further, the array substrate 1 includes a plurality of scanning lines G (G1 to Gm) which are disposed along rows of the pixel electrodes PE, a plurality of signal lines S (S1 to Sn) which are disposed along columns of the pixel electrodes PE, and a plurality of pixel switches W which are disposed near intersections between the scanning lines G and signal lines S.

Each pixel switch W is composed of, e.g. a thin-film transistor. The pixel switch W has a gate connected to the scanning line G, and a source-drain path connected between the signal line S and the pixel electrode PE. Each pixel switch W permits, when driven via the associated scanning lines G, electrical conduction between the associated signal lines S and the associated pixel electrodes PE.

The controller CNT includes a gate driver GD which successively drives the scanning lines G1 to Gm so as to turn on the plural pixel switches W on a row-by-row basis; a source driver SD which outputs video signals or non-video signals to the plural signal lines S1 to Sn during a time period in which the pixel switches W of each row are turned on by the driving of the associated scanning line G; a backlight driving unit LD which drives the backlight BL; and a control circuit 5 which controls the gate driver GD, source driver SD and backlight driving unit (inverter) LD.

The control circuit 5 is configured to execute an initializing process for transitioning liquid crystal molecules from splay alignment to bend alignment by varying a counter-voltage Vcom at a time of power-on and applying a relatively high driving voltage to the liquid crystal layer 3.

The control circuit 5 outputs to the gate driver GD a control signal CTG which is generated on the basis of a sync signal that is input from an external signal source SS. The control circuit 5 outputs to the source driver SD a control signal CTS which is generated on the basis of the sync signal that is input from the external signal source SS, and a video signal or a reverse-transition prevention voltage for black insertion, which is input from the external signal source SS. Further, the control circuit 5 outputs a counter-voltage Vcom, which is to be applied to the counter-electrode CE, to the counter-electrode CE of the counter-substrate 2.

As described above, the source driver SD drives the plural signal lines S1 to Sn in parallel. The voltage (hereinafter referred to as "source voltage") that is applied to the signal line, S1 to Sn, is applied via the associated pixel switch W to the pixel electrode PE of the liquid crystal pixel PX of the selected row, which is electrically connected to the drain electrode of the pixel switch W via a contact hole CH (shown in FIG. 2).

The liquid crystal capacitance ClC is formed between the counter-electrode CE and the pixel electrode PE by the source voltage at the pixel electrode PE and the counter-voltage Vcom that is applied to the counter-electrode CE. The storage capacitance line C forms a storage capacitance between itself and the pixel electrode PE that is electrically connected to the drain electrode of the pixel switch W, and compensates for, e.g. a voltage drop of the pixel electrode PE due to off-leak of the pixel switch W.

The source voltages for all liquid crystal pixels PX are set at opposite polarities on a column-by-column basis of liquid crystal pixels PX in the case of a column-reversal driving method, and set at opposite polarities on a frame-by-frame basis in the case of a frame-reversal driving method.

Figure 3:
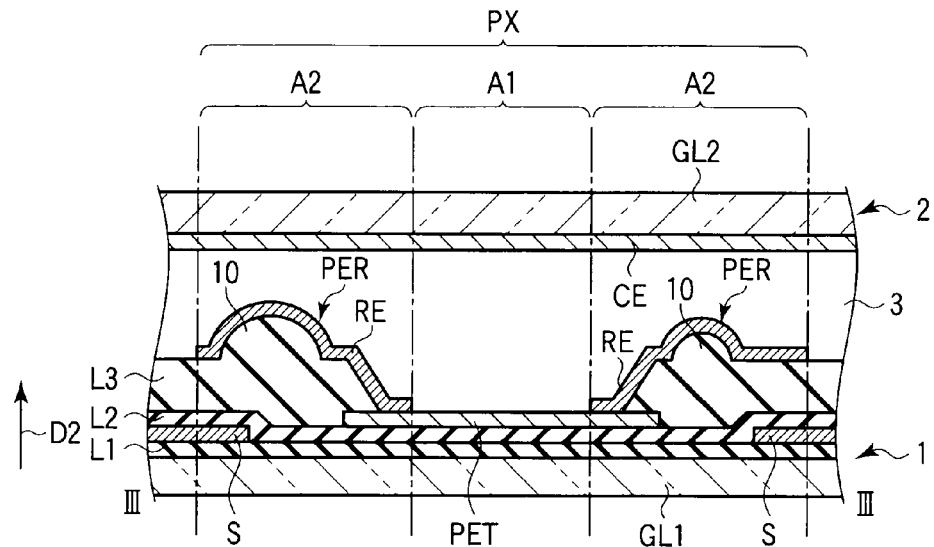
FIG. 3 schematically shows an example of a cross section, taken along line III-III, of the display pixel shown in FIG. 2.

As shown in FIG. 2 and FIG. 3, in the liquid crystal display device according to the present embodiment, each of the display pixels PX includes a transmissive display area A1 and a reflective display area A2. The pixel electrode PE includes, in the transmissive display area A1, a transmissive electrode part PET that passes light, which is incident from the array substrate 1 side, to the liquid crystal layer 3, and includes, in the reflective display area A2, a reflective electrode part PER that reflects light which is incident from the counter-substrate 2 side to the liquid crystal layer 3.

The transmissive electrode part PET is formed of a transparent electrode material such as ITO. The reflective electrode part PER includes a reflector RE, which is an electrode formed of a material such as aluminum, and an organic film (HRC) L3 which is an underlayer of the reflector RE. Further, the reflective electrode part PER includes a projection portion 10 which is opposed to the counter-electrode CE.

As shown in FIG. 3, in the transmissive display area A1, the transmissive electrode part PET of the pixel electrode PE is disposed on the insulating substrate GL1 of the array substrate 1 via insulation layers L1 and L2. On the other hand, in the reflective display area A2, the signal line S, which extends in the longitudinal direction of the pixel electrode PE, is disposed on the insulating substrate GL1 of the array substrate 1 via the insulation layer L1. Further, the organic film (HRC) L3 of the reflective electrode part PER is disposed on the signal line S via the insulation layer L2.

Furthermore, in a part of the reflective display area A2, the organic film (HRC) L3 is disposed on the insulating substrate GL1 of the array substrate 1 via the insulation layers L1 and L2. Besides, in another part of the reflective display area A2, the organic film (HRC) L3 of the reflective electrode part PER is disposed on the insulating substrate GL1 of the array substrate 1 via the insulation layers L1 and L2 and the transmissive electrode part PET disposed on the insulation layers L1 and L2. At last, in the reflective display area A2, the reflector RE is disposed on the organic film L3. A part of the reflector RE is electrically connected to the transmissive electrode part PET.

The organic film L3 functions to set the thickness of the liquid crystal layer 3 in the reflective display area A2 at about ½ of the thickness of the liquid crystal layer 3 in the transmissive display area A1, and forms a projection portion 10, which projects in a thickness direction D2 of the array substrate 1, on the reflective electrode part PER in order to increase the viewing angle at the time of reflective display.

In the liquid crystal display device according to the present embodiment, the organic film L3, as shown in FIG. 3, includes a projection portion which projects in the thickness direction D2 of the array substrate 1. Accordingly, the reflector RE, which is disposed on the organic film L3, is provided with a projection portion which projects in the thickness direction D2 of the array substrate 1 in association with the projection portion of the organic film L3. Thus, the projection portion 10 of the reflective electrode part PER is composed of the projection portion of the organic film L3 and the projection portion of the reflector RE.

At an end portion AR which is disposed to the storage capacitance line C of the reflective electrode part PER, a transverse electric field generating section is disposed so as to generate a transverse electric field in the vicinity of the projection portions 10. In the liquid crystal display device according to the present embodiment, electrode missing parts PEL are disposed so as to include parts of the projection portions 10. In each electrode missing part PEL, the reflector RE is removed.

Figure 4:
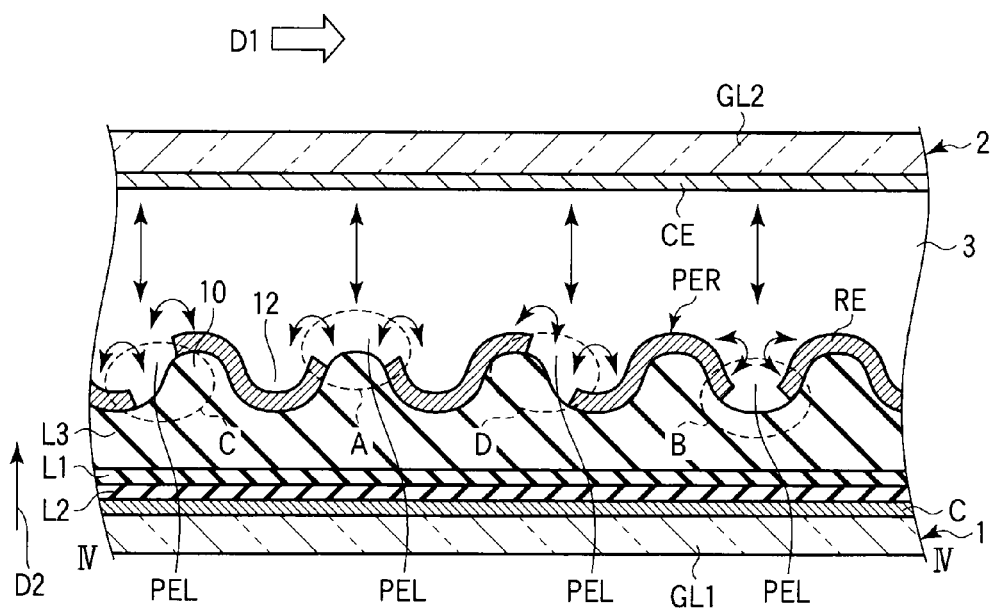
FIG. 4 schematically shows an example of a cross section, taken along line IV-IV, of the display pixel shown in FIG. 2.

In the liquid crystal display device according to the present embodiment, the electrode missing part PEL has a substantially rectangular shape. For example, as shown in FIG. 4, the parts of the projection portions 10 of the reflective electrode part PER include a top part of the projection portion 10, an inclined surface part of the projection portion 10, and a trough part 12 between the projection portions 10.

Figure 5:
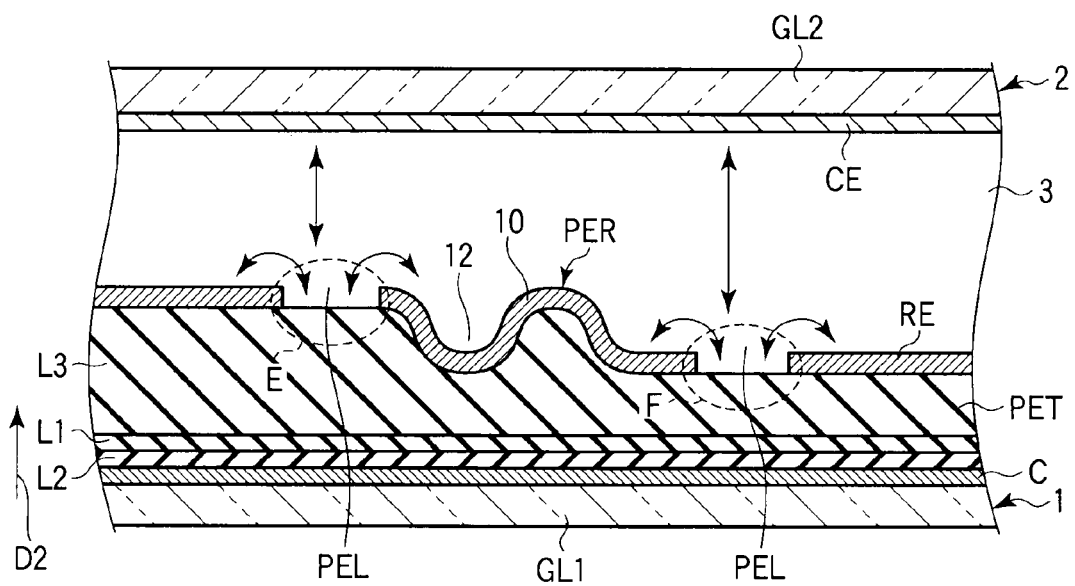
FIG. 5 is a view for explaining an example of a verification experiment result of the transition probability at a time of initialization, according to the position of a transition nucleus that is provided on the reflective electrode part.

Now consider a case in which the electrode missing parts PEL are disposed in the reflective electrode part PER in the following fashion. Specifically, as shown in FIG. 4 and FIG. 5, consider a case in which the electrode missing parts PEL of the reflective electrode part PER are disposed near a top of the projection portion 10 (position A in FIG. 4), at a trough between projection portions 10 (position B in FIG. 4), at an inclined surface (position C in FIG. 4) on a rubbing-up side at the time of rubbing of the projection portion 10, at an inclined surface (position D in FIG. 4) on a rubbing-down side at the time of rubbing of the projection portion 10, at a planar surface (position E in FIG. 5) which is substantially on a level with the top of the projection portion 10, and at a planar surface (position F in FIG. 5) which is substantially on a level with the bottom of the trough between projection portions 10.

In the vicinity of the electrode missing parts PEL, there are a transverse electric field which is generated by a potential of the storage capacitance line C that is an underlayer wiring line and a potential of the reflective electrode part PER, and a vertical electric field which is generated between the pixel electrode PE and storage capacitance line C, on the one hand, and the counter-electrode CE, on the other hand. The "vertical electric field", in this context, refers to an electric field which is substantially parallel to the thickness direction D2 of the array substrate 1, and the "transverse electric field" refers to an electric field having a component substantially parallel to the substrate plane of the array substrate 1.

In the liquid crystal display device according to the present embodiment, since the substantially rectangular electrode missing parts PEL are provided at the end portion AR of the reflector RE, transverse electric fields occur in directions substantially perpendicular to the end portions of the electrode missing parts PEL. In other words, there occur a transverse electric field having a component that is substantially parallel to the direction of extension of the signal line S, and a transverse electric field having a component that is substantially parallel to the direction of extension of the gate line G.

By disposing the electrode missing parts PEL in the above-described fashion, the transverse electric field occurs near the projection portions 10 when a high voltage is applied between the pixel electrode PE and the storage capacitance line C. No matter where the pattern is disposed, a relatively great transverse electric field can be applied to the liquid crystal layer 3 by varying the counter-voltage Vcom at the time of power-on and applying a relatively high driving voltage to the liquid crystal layer 3, and it is considered, therefore, that the transition of the liquid crystal molecules can be facilitated.

With the electrode missing parts PEL being provided at the above-described positions A to F, a verification experiment of transition probability at a time of initialization was conducted. When the liquid crystal display device was initialized with the electrode missing parts PEL being provided at the positions A to F in an environment of −20° C., transition of liquid crystal molecules occurred in the case where the electrode missing parts PEL were provided at the positions A to D, but transition of liquid crystal molecules hardly occurred in the case where the electrode missing parts PEL were provided at the positions E and F.

In short, the time of transition ("transition time") from the splay alignment to the bend alignment in the entire liquid crystal layer 3 by the initializing process was made shorter in the case of providing the electrode missing parts PEL at the position A to position D than in the case of providing the electrode missing parts PEL at the position E and position F.

There was little difference in transition time between four cases in which the electrode missing parts PEL were provided in the positions A to D, respectively. In addition, there was little difference in transition time between two cases in which the electrode missing parts PEL were provided in the positions E and F.

It turned clear, from the above, that in the case where a transition nucleus is formed in the reflective display area A2 in the OCB mode transflective liquid crystal display device, the time that is needed for transition of the liquid crystal layer 3 at the time of power-on can be made shorter in the case of providing the electrode missing parts PEL in a such a manner as to include parts of the projection portions 10 of the reflective electrode part PER at the end portion AR of the reflective electrode part PER, than in the case of providing the electrode missing parts PEL at planar parts.

Therefore, according to the liquid crystal display device of the present embodiment, the time that is needed for initialization can be decreased in the OCB mode transflective liquid crystal display device.

The present invention is not limited directly to the above-described embodiment. In practice, the structural elements can be modified and embodied without departing from the spirit of the invention. For example, in the liquid crystal display device according to the above-described embodiment, the substantially rectangular electrode missing parts PEL are provided at the end portion of the reflector RE. However, it should suffice if the electrode missing part PEL has such a shape as to generate a transverse electric field between itself and another underlying electrically conductive layer, and the electrode missing part PEL may have, for instance, a triangular shape or a semicircular shape. In this case, too, a transverse electric field occurs in a direction substantially perpendicular to the end portion of the electrode missing part PEL, and the same advantageous effect as with the liquid crystal display device according to the above-described embodiment can be obtained.

In the liquid crystal display device according to the above-described embodiment, the electrode missing parts PEL, which include parts of the projection portions 10 and from which the reflector RE is removed, are disposed as the transverse electric field generating section at the end portion AR of the reflective electrode part PER that is opposed to the storage capacitance line C. However, the invention is not limited to this example. Alternatively, electrode extension parts, in which the reflector RE extends so as to include parts of the projection portions 10, may be disposed as the transverse electric field generating section at the end portion AR of the reflective electrode part PER that is opposed to the storage capacitance line C.

In the case where the reflector RE includes, for example, substantially rectangular extension parts, a transverse electric field occurs between the reflector RE and the storage capacitance line C, like the above-described case in which the electrode missing parts PEL are provided at the end portion AR of the reflector RE. Thus, even in the case where the reflector RE is disposed so as to extend in a manner to include parts of the projection portion 10, the same advantageous effect as with the liquid crystal display device of the above-described embodiment can be obtained.

Various inventions can be made by properly combining the structural elements which are disclosed in the embodiment. For example, some structural elements may be omitted from all the structural elements disclosed in the embodiment. Furthermore, structural elements in different embodiments may properly be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
a first electrode substrate including a pixel electrode and an underlying wiring line to which a voltage that is different from a voltage of the pixel electrode is applied, and at least a part of which is opposed to the pixel electrode;
a second electrode substrate including a counter-electrode which is opposed to the pixel electrode; and
an OCB (Optically Compensated Bend) mode liquid crystal layer which is held between the first electrode substrate and the second electrode substrate, and which is in a first state prior to power-on and transitions to a second state, which is different from the first state, at a time of a display operation,
wherein the pixel electrode includes a transmissive electrode part that passes light, which is incident from the first electrode substrate side, to the liquid crystal layer, and a reflective electrode part that reflects light which is incident from the second electrode substrate side to the liquid crystal layer, and
the reflective electrode part includes a projection portion which is opposed to the counter-electrode,
wherein an electrode missing part from which a reflective electrode is removed is disposed so as to include a part of the reflective electrode of an outer surface of the projection portion at an end portion of the reflective electrode part, which is opposed to the underlying wiring line, the electrode missing part is formed on an inclined surface part of the projection portion, and the electrode missing part is disposed so as to generate a transverse electric field between the underlying wiring line and the reflective electrode part.

2. The liquid crystal display device according to claim 1, wherein the underlying wiring line is a storage capacitance line which is disposed in such a manner as to form a storage capacitance between itself and the pixel electrode.

3. The liquid crystal display device according to claim 1, wherein the first state is a splay alignment state and the second state is a bend alignment state.

* * * * *